(12) United States Patent
Zhao

(10) Patent No.: US 10,148,835 B2
(45) Date of Patent: Dec. 4, 2018

(54) IMAGE PROCESSING DEVICE, PRINTING APPARATUS, AND CONTROL METHOD

(71) Applicant: SEIKO EPSON CORPORATION, Tokyo (JP)

(72) Inventor: Danjun Zhao, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/962,781

(22) Filed: Apr. 25, 2018

(65) Prior Publication Data

US 2018/0316812 A1 Nov. 1, 2018

(30) Foreign Application Priority Data

Apr. 27, 2017 (JP) ................................. 2017-087984

(51) Int. Cl.
*H04N 1/00* (2006.01)

(52) U.S. Cl.
CPC ....... *H04N 1/00652* (2013.01); *H04N 1/0009* (2013.01); *H04N 1/00045* (2013.01); *H04N 1/00087* (2013.01)

(58) Field of Classification Search
CPC ........... H04N 1/00652; H04N 1/00045; H04N 1/00087; H04N 1/0009
USPC ...................................................... 358/1.13
See application file for complete search history.

(56) References Cited

U.S. PATENT DOCUMENTS

| | | | | |
|---|---|---|---|---|
| 4,045,136 A | * | 8/1977 | Watson | G03B 27/475 355/83 |
| 5,036,402 A | * | 7/1991 | Shiota | G03B 15/003 348/99 |
| 5,121,261 A | * | 6/1992 | Isogai | H04N 1/409 348/14.01 |
| 5,289,570 A | * | 2/1994 | Suzuki | G06T 11/60 355/114 |
| 7,167,266 B2 | * | 1/2007 | Sakai | H04N 1/00352 358/1.13 |

FOREIGN PATENT DOCUMENTS

| | | |
|---|---|---|
| JP | 2006-27618 A | 10/2006 |
| JP | 2007-318558 A | 12/2007 |

* cited by examiner

*Primary Examiner* — Allen H Nguyen
(74) *Attorney, Agent, or Firm* — Foley & Lardner LLP

(57) ABSTRACT

An image processing device is adapted to be provided with a photographing device configured to generate image data by photographing a print pattern and to output the image data, vertical synchronization signals, and horizontal synchronization signals. The image processing device includes: a first processor configured to, based on the synchronization signals, determine occurrence of abnormalities of the image data that is input, a memory including two storage areas, and a second processor. The second processor is configured to perform for each frame of the image data an addition process while exchanging a first storage area and a second storage area different from the first storage area of the memory with each other.

7 Claims, 4 Drawing Sheets

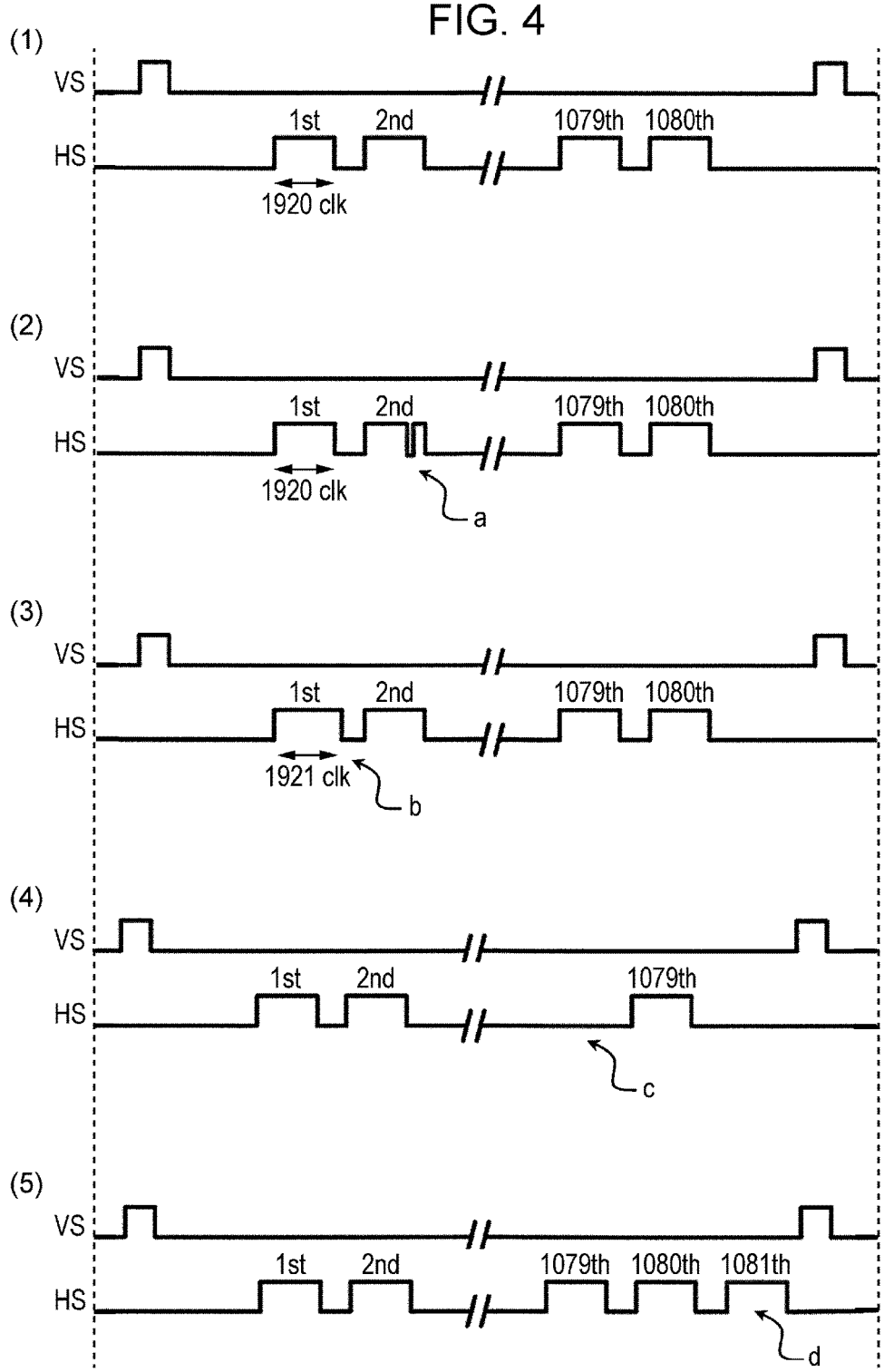

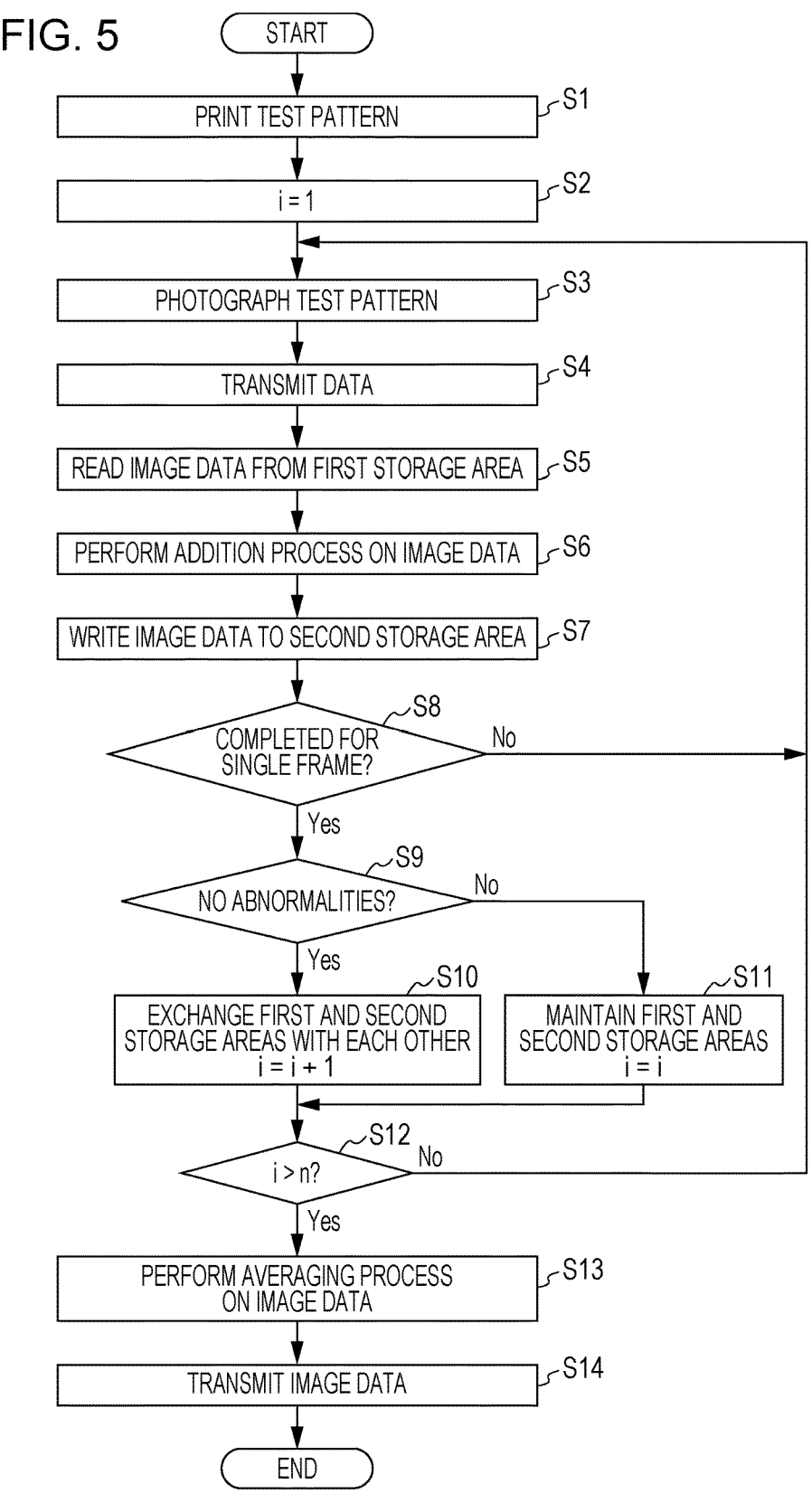

IMAGE PROCESSING DEVICE, PRINTING APPARATUS, AND CONTROL METHOD

CROSS REFERENCE TO RELATED APPLICATIONS

This application claims priority to Japanese Application No. 2017-087984, filed Apr. 27, 2017; the contents of which are herein incorporated by reference in their entirety.

BACKGROUND

1. Technical Field

The present invention relates generally to image processing devices and the like for processing images of print patterns and, in particular, to an image processing device and the like configured to achieve fast processing in which occurrence of an abnormal image is taken into account, without increasing the size of the apparatus.

2. Related Art

Ink jet printers and the like which eject ink through nozzles to thereby perform printing onto print media are widespread. In such printing apparatuses, printing errors such as printing irregularities are likely to occur depending on the condition of the apparatus. It is, therefore, necessary to detect occurrence of such errors so that appropriate apparatus adjustments may be performed as needed.

The apparatus adjustments, or calibration, in the printing apparatus typically involve printing a predetermined print pattern. The adjustments further involve one of the following processes: visually examining the print pattern; and acquiring the print pattern in a form of image data to perform image processing, so that occurrence of such errors may be determined.

In addition, regarding the acquisition of image data, which is performed when performing the adjustments, it is known that taking a photograph with a camera may cause acquired image data to be abnormal because noise interferes with synchronization signals (see, for example, JP-A-2007-318558).

In order to precisely perform the above-described calibration of the printing apparatus by taking a photograph with a camera, it is necessary to photograph the same print pattern multiple times and to average a plurality of pieces of the resultant image data.

There is a demand for the processes described above to be performed at high speed by small apparatuses with the occurrence of the abnormal image described above being taken into account.

SUMMARY

An advantage of some aspects of the invention is to provide, for example, an image processing device for processing an image of a print pattern at high speed while taking occurrence of an abnormal image into account and without increasing the size of the device.

According to an aspect of the invention, there is provided an image processing device adapted to be provided with a photographing device that is configured to generate image data by photographing a print pattern printed on a medium. The photographing device is further configured to output the generated image data, vertical synchronization signals defining a single frame of the image data, and horizontal synchronization signals each defining a line of the single frame. The image processing device includes: a first processor configured to, based on the vertical synchronization signals and the horizontal synchronization signals, determine occurrence of abnormalities of the image data that is input; a memory including two storage areas; and a second processor. The second processor is configured to perform for each frame of the image data an addition process while exchanging a first storage area of the memory to be used for reading and a second storage area different from the first storage area of the memory to be used for writing with each other. The second processor is further configured to, after completing addition processes for a whole of the image data, generate averaged image data. The addition process includes: reading data from the first storage area; adding the read data to one frame of the image data that is input; and writing resultant data to the second storage area. The second processor is further configured to, in a case where the first processor determines occurrence of an abnormality in a frame of the image data that is input, cause the photographing device to take a photograph of the print pattern again to generate image data, cause the photographing device to output the image data that is generated, and perform, without exchanging the first and the second storage areas of the memory with each other, the addition process on the image data that is input.

According to the aspect, averaged image data in which the abnormal image is excluded is generated and image data corresponding to the print pattern is generated with high accuracy. In addition, using the two storage areas of the memory while exchanging the two storage areas with each other enables image processing, which includes the processing of the abnormal image, to be performed at high speed by a small apparatus.

In this case, it is preferable that the first processor be configured to, based on a rising frequency or a rising width of each horizontal synchronization signal in a period during which the vertical synchronization signals are output, determine occurrence of the abnormalities of the image data that is input.

The configuration described above enables an accurate determination of the abnormal image that is caused by a signal error due to noise or the like.

According to another aspect of the invention, there is provided a printing apparatus that includes a printing section configured to perform printing onto a medium and any one of the above-described image processing devices.

In this case, it is preferable that the printing apparatus further include a correction section that is configured to, based on the averaged image data, perform at least one of an adjustment of a starting position of printing and an adjustment of a transportation amount of the medium.

The configuration described above enables apparatus adjustments based on the image data which is highly accurate corresponding to the print pattern, resulting in printing with high quality.

According to further another aspect of the invention, there is provided a control method for controlling an image processing device provided with a memory including two storage areas, the image processing device being adapted to be provided with a photographing device configured to generate image data by photographing a print pattern printed on a medium and to output the generated image data, vertical synchronization signals defining a single frame of the image data, and horizontal synchronization signals each defining a line of the single frame. The control method includes: determining, based on the vertical synchronization signals and the horizontal synchronization signals, occurrence of abnormalities of the image data that is input; and performing operations. The operations include: performing for each frame of the image data an addition process while exchanging a first storage area of the memory to be used for reading and a second storage area different from the first storage area of the memory to be used for writing with each other; and generating, after completing whole performance of the addition process, averaged image data. Each of the addition process includes reading data from the first storage area, adding the read data to one frame of the image data that is input, and writing resultant data to the second storage area. In a case where occurrence of an abnormality is determined, in the determining, in a frame of the image data that is input, the photographing device is caused to take a photograph of the print pattern again to generate image data, to output the image data generated, and without exchanging the first and the second storage areas of the memory with each other, the addition process is performed on the image data that is input.

Additional advantages and features of some aspects of the invention will be clearly described in the following preferred embodiments of the invention.

BRIEF DESCRIPTION OF THE DRAWINGS

The invention will be described with reference to the accompanying drawings, wherein like numbers reference like elements.

FIG. 4 is a diagram illustrating an example of a synchronization signal error.

FIG. 5 is a flow chart illustrating an exemplary processing procedure of a test mode.

DESCRIPTION OF EXEMPLARY EMBODIMENTS

Figure 1:
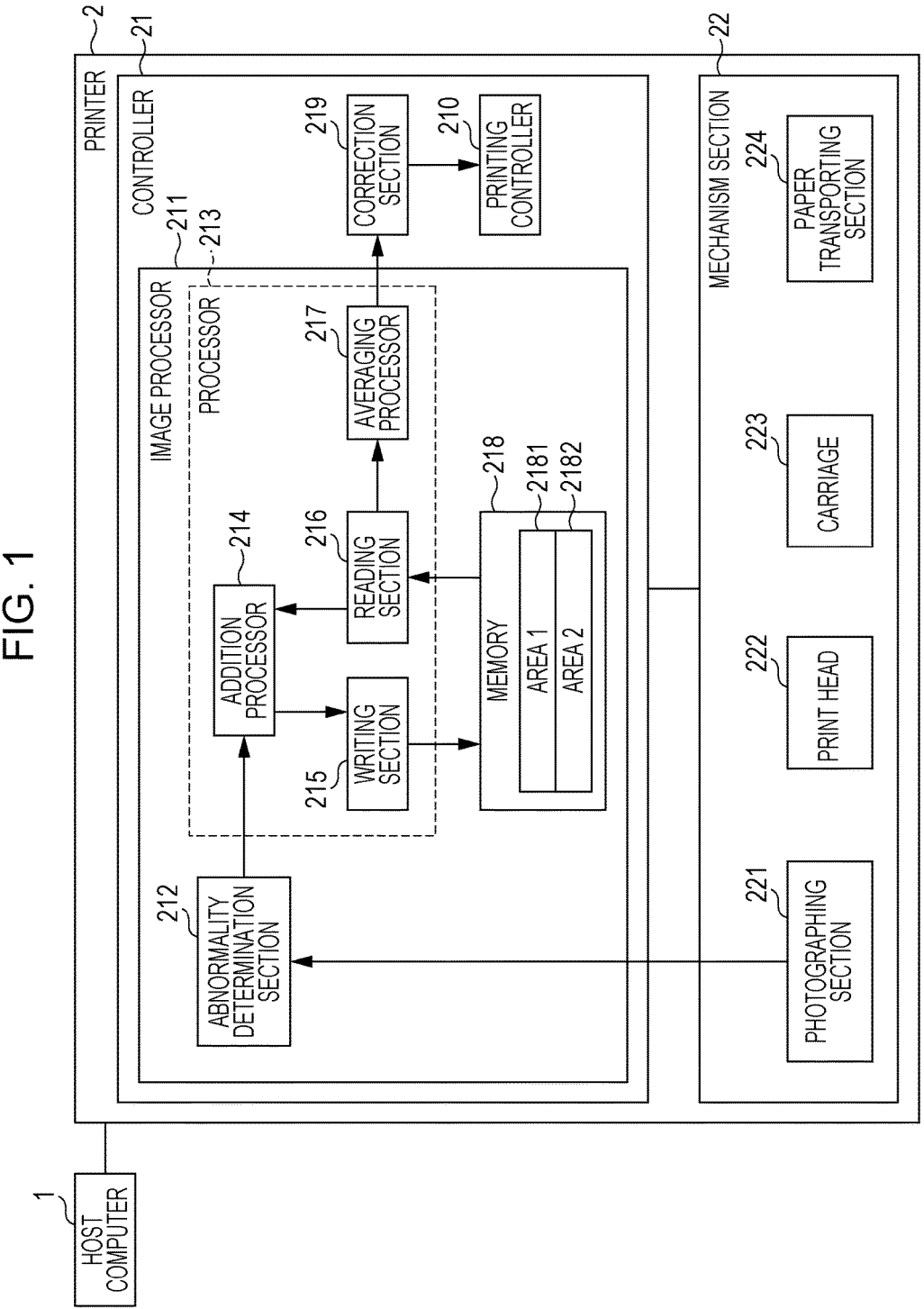
FIG. 1 is a schematic block diagram illustrating an embodiment of a printing apparatus to which the invention is applied.

Preferred embodiments of the invention will be described hereinafter with reference to the accompanying drawings. The embodiments, however, should not serve to limit any aspect of the invention. It should be noted that an explanation will be made with the same components or similar components being denoted by the same reference numerals or the same reference signs in the drawings.

FIG. 1 is a schematic block diagram illustrating an embodiment of a printing apparatus to which the invention is applied. A printer 2 illustrated in FIG. 1 corresponds to the printing apparatus to which the invention is applied. The printer 2 includes a photographing section 221 provided in a carriage 223. The carriage 223 is equipped with at least one print head 222 and moves. In an operation of a test mode, the printer 2 prints a test pattern, or a print pattern, on a printing medium (for example, a sheet M) and photographs the test pattern more than once with the photographing section 221. Pieces of image data after photographing are transmitted to an image processor 211 that includes two storage areas, or a storage area 2181 denoted as "area 1" and a storage area 2182 denoted as "area 2", serving as a memory 218. In the image processor 211, an averaging process is performed on the pieces of image data. In these processes, for every transmission of image data, the image processor 211 performs processes that include reading data from one storage area of the memory 218, performing an addition process on the read data and the transmitted image data, and writing the resultant data to the other storage area of the memory 218. The image processor 211 performs the addition process while exchanging the two storage areas of the memory 218 with each other for image data corresponding to a single photographing action, or a single frame. However, the image processor 211 determines occurrence of abnormalities of the image data corresponding to each frame and performs the photographing action again with respect to image data that is found to be abnormal, hereinafter, referred to as an abnormal image. The image processor 211 performs the addition process on re-photographed image data without exchanging the two storage areas of the memory 218 with each other. In the printer 2, the configuration and the processes described above enable fast image processing for apparatus adjustments to be performed with high accuracy, and further enable the memory capacity to be reduced.

As illustrated in FIG. 1, the printer 2 according to the embodiment is a printer that performs printing onto, for example, the sheet M in response to a print request sent from, for example, a host computer 1. Here, for example, the printer 2 is a large ink jet printer. It should be noted that, in the embodiment, the image processor 211 or a combination of the image processor 211 and the photographing section 221 corresponds to an image processing device.

The printer 2 includes a controller 21 and a mechanism section 22 as illustrated in FIG. 1. The controller 21 is a controller for controlling each of the components of the printer 2. The controller 21 includes a program that describes processing details, a processor (CPU) configured to execute the processing in accordance with the program, random access memory (RAM), read-only memory (ROM) for storing the program, an application specific integrated circuit (ASIC), and other devices (not illustrated). The CPU reads and executes the program stored in the ROM to thereby control each of the components of the printer 2.

The printer 2 has a normal mode (a printing mode) and a test mode. In the normal mode, in response to, for example, receiving print data from the host computer 1, the controller 21 controls, in accordance with the print data, the print head 222, the carriage 223, and a paper transporting section 224, which will be described later, to perform a printing process requested on, for example, the sheet M. In the control on the print head 222, the controller 21 causes ink to be ejected through a plurality of nozzles provided in the print head 222.

On the other hand, in the test mode for the apparatus adjustments, or the calibration, the controller 21 controls the mechanism section 22, which will be described later, to perform the printing of the test pattern, the photographing of the test pattern, image processing on the photographed result (image data), analysis of the processed image data, and a process of the adjustments based on the analysis result. The details of the processes in the test mode will be described later.

The controller 21 includes functions as illustrated in FIG. 1. The controller 21 includes the image processor 211, a correction section 219, and a printing controller 210.

The image processor 211 includes an abnormality determination section 212 (first processor) configured to determine occurrence of abnormalities of image data. In the test mode, the abnormality determination section 212 receives image data transmitted from the photographing section 221, which will be described later. Furthermore, the abnormality determination section 212 transfers the received image data to a processor 213 (second processor) configured to perform operations and also performs a process to determine occurrence of abnormalities of the received image data. The details of the process to determine occurrence of abnormalities will be described later.

The processor 213 performs the addition process and the averaging process on image data corresponding to the test pattern photographed in the test mode. The image data is transferred from the abnormality determination section 212. The processor 213 includes an addition processor 214 for performing the addition process, an averaging processor 217 for performing the averaging process, a writing section 215 for writing data to the memory 218, and a reading section 216 for reading data from the memory 218, as illustrated in FIG. 1. The details of the addition process and the averaging process will be described later.

The memory 218 is composed of a storage device, such as RAM, for the image processor 211. The memory 218 includes the two storage areas, or the storage area 2181 and the storage area 2182, as illustrated in FIG. 1.

The correction section 219 performs the apparatus adjustments of the printer 2 in accordance with image data transmitted from the image processor 211. For the apparatus adjustments, the correction section 219 performs, for example, an adjustment of a starting position of printing and an adjustment of a transportation amount of the printing medium or the sheet M.

When a print request is sent to the printer 2, the printing controller 210 interprets print data and controls, based on the interpretation result, each of the components of the mechanism section 22 to perform a printing process on the printing medium, or, for example, the sheet M. In the test mode, the printing controller 210 prints the test pattern and receives a process of the apparatus adjustments prepared by the correction section 219.

The mechanism section 22 is controlled by the controller 21, such that the mechanism section 22 performs the printing process in the normal mode, the photographing process in the test mode, and the like. As illustrated in FIG. 1, the mechanism section 22 includes the photographing section 221, the at least one print head 222, the carriage 223, the paper transporting section 224, and the like.

Figure 2:
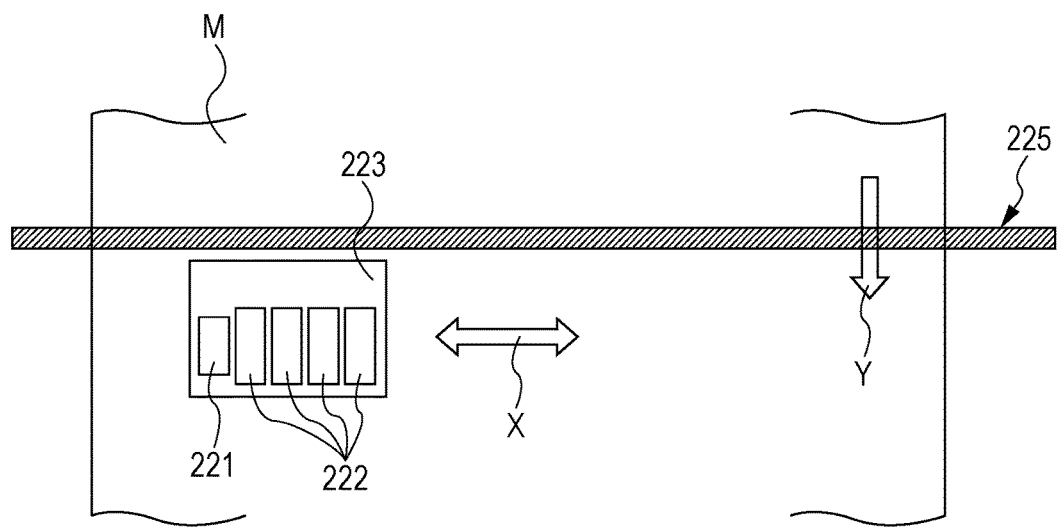
FIG. 2 is a plan view schematically illustrating a mechanism section in the peripheral region of a carriage.

FIG. 2 is a plan view schematically illustrating the mechanism section 22 in the peripheral region of the carriage 223. The print head 222 includes the plurality of nozzles. The print head 222 ejects the ink through the nozzles onto the sheet M in accordance with instructions given by the controller 21, thereby forming an image on the sheet M. In this way, the print head 222 performs printing.

As illustrated in FIG. 2, the at least one print head 222 includes a plurality of the print heads 222, and is mounted on the carriage 223. In the case where, for example, four different color inks are used, respective print heads 222 are provided for the corresponding color inks.

The photographing section 221, or a photographing device, includes a camera, a light source for lighting, and the like. The photographing section 221, specifically, the camera, photographs the sheet M, which is the printing medium, to acquire the image, which is printed on the sheet M, in a form of image data. In other words, the photographing section 221 generates a piece of image data. As illustrated in FIG. 2, the photographing section 221 is mounted on the carriage 223. The photographing section 221 mainly photographs the printed test pattern in the test mode. A piece of image data corresponding to the test pattern photographed is transmitted from the photographing section 221 to the image processor 211, specifically, to the abnormality determination section 212. The camera of the photographing section 221 includes a CMOS (Complementary Metal Oxide Semiconductor) sensor and a lens, for example.

The light source of the photographing section 221 performs lighting for the photographing by the camera and is disposed in the vicinity of the camera. The light source illuminates an object, or a photographing region, to be photographed by the camera with light. The amount of the light is adjustable. The light source includes, for example, a plurality of light emitting diode (LED) lamps.

Figure 3:
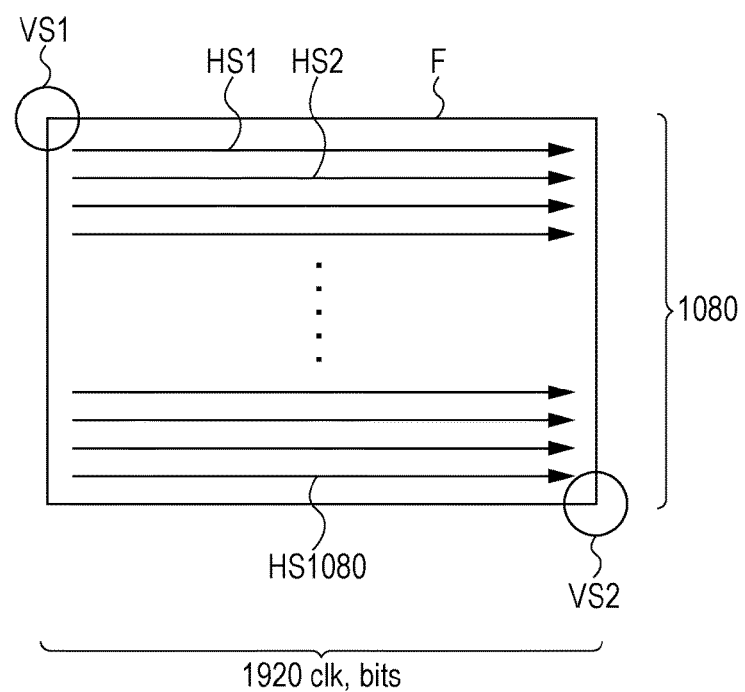
FIG. 3 schematically illustrates a photographing area, or a single frame, to be photographed by a photographing section.

FIG. 3 schematically illustrates a photographing area, or a single frame F, to be photographed by the photographing section 221. In the example illustrated in FIG. 3, the region of the frame F corresponds to the photographing region. A single photographing action acquires a piece of image data that contains 1080×1920 pixels. The photographing action and the acquisition of the piece of image data are carried out from the upper left portion denoted by reference character VS1 in FIG. 3 to the lower right portion denoted by reference character VS2 in FIG. 3. Specifically, the photographing action and the acquisition of the piece of image data are carried out in a direction of the arrows denoted by reference characters HS1 to HS1080, and in order of the arrows with respect to the numeral in each arrow reference character as illustrated in FIG. 3, in other words, from the top to the bottom of FIG. 3.

The photographing section 221 outputs two vertical synchronization signals VS that indicate the start of the photographing action and the end of the photographing action of a single frame F. Specifically, the photographing section 221 outputs a first one of the vertical synchronization signals VS at a time point of VS1 illustrated in FIG. 3 whereas the photographing section 221 outputs a second one of the vertical synchronization signals VS at a time point of VS2 illustrated in FIG. 3. In addition, the photographing section 221 outputs a horizontal synchronization signal HS in each of the scans indicated in FIG. 3 by the arrows denoted by the reference signs HS1 to HS1080. The photographing section 221 therefore outputs the horizontal synchronization signal HS a total of 1080 times. Accordingly, the vertical synchronization signals VS define a single frame of image data whereas a horizontal synchronization signal HS defines a single line of image data.

In the photographing action for a single frame F, the photographing section 221 outputs, or transmits, data to the abnormality determination section 212 of the image processor 211 in the order of the first vertical synchronization signal VS, a first horizontal synchronization signal HS and image data acquired in a corresponding scan, a second horizontal synchronization signal HS and image data acquired in a corresponding scan, . . . , a 1080th horizontal synchronization signal HS and image data acquired in a corresponding scan, and the second vertical synchronization signal VS.

The carriage 223 carries the print head 222 and the photographing section 221 and moves the print head 222 and the photographing section 221 in a scanning direction, or a direction of arrow X illustrated in FIG. 2. The carriage 223 is driven along a carriage rail 225 by a driving source and a power transmission device (not illustrated). The carriage 223 moves under the control of the printing controller 210 in the case of, for example, printing.

In the printing, the print head 222, which is moved in the scanning direction by the carriage 223, ejects ink onto the sheet M that is being transported, as illustrated in FIG. 2, in a sub-scanning direction, or a direction of arrow Y of FIG. 2, such that an image is formed on the sheet M.

The paper transporting section 224 is a device for transporting the sheet M in the sub-scanning direction. The paper transporting section 224 includes a transport roller, a driving source for the transport roller, a power transmission device, a transport path, and the like (not illustrated). The paper transporting section 224 is driven under the control of the printing controller 210 in the case of, for example, printing.

The printer 2, which includes the configurations described above, operates in the normal mode and in the test mode, as described above. In the normal mode, on receiving the print request, or the print data, which is sent from, for example, the host computer 1, the controller 21, or the printing controller 210, controls each of the components of the mechanism section 22 in accordance with the print request to thereby perform printing onto the sheet M, which serves as the print medium. Specifically, while moving in the scanning direction, the print head 222 ejects the ink onto the sheet M, which is being transported in the sub-scanning direction, to form the image. The sheet M after printing is completed is discharged by the paper transporting section 224.

In order to check the printing condition of the printer 2 in the test mode, processes such as the printing of the test pattern, the photographing of the test pattern, the processing on image data corresponding to the test pattern, and the detecting of printing failures based on the image data are performed. These processes in the test mode have distinctive features. Details will hereinafter be described specifically.

First, an explanation will be made on possible errors in the photographing of the test pattern. The printer 2 checks for an error corresponding to acquired image data being incorrect because of noise or the like that interferes with the above-described synchronization signals, specifically the horizontal synchronization signal HS, of the photographing section 221. In other words, the printer 2 checks for an error corresponding to an abnormal image being acquired.

FIG. 4 is a diagram illustrating examples of synchronization signal errors. (1) of FIG. 4 illustrates normal synchronization signals, or normal vertical synchronization signals VS and normal horizontal synchronization signals HS. In each of (1) to (5) of FIG. 4, the synchronization signals in photographing a single frame F are shown in time series. The upper synchronization signals represent the vertical synchronization signals VS and the lower synchronization signals represent the horizontal synchronization signals HS.

As described above, in a normal case, the horizontal synchronization signal HS is transmitted, or output, 1080 times from the photographing section 221 between the vertical synchronization signals VS, which indicate the start and the end, as illustrated in (1) of FIG. 4.

When the synchronization signals are disturbed by, for example, noise, the rising width of any one of the horizontal synchronization signals HS or a rising frequency of the horizontal synchronization signals HS in a period during which the vertical synchronization signals VS are output is likely to have an abnormality.

(2) and (3) of FIG. 4 illustrate examples in which the rising widths of the horizontal synchronization signals HS have errors. In the examples shown here, the rising width of the horizontal synchronization signal HS is 1920 clocks (clk) for a normal case. In the example illustrated in (2) of FIG. 4, however, the profile of the second horizontal synchronization signal HS denoted by reference character "a" has a missing portion. Image data is acquired in a period during which the horizontal synchronization signal HS is output. Accordingly, in this case, part of image data will be missed. Also in the example illustrated in (3) of FIG. 4, the first horizontal synchronization signal HS denoted by reference character "b" has a rising width of 1921 clk, namely that the rising width is wider. In this case, image data corresponding to an unnecessary portion will be acquired.

(4) and (5) of FIG. 4 illustrate examples in which the rising frequencies of the horizontal synchronization signals HS have errors. In the example illustrated in (4) of FIG. 4, the 1079th horizontal synchronization signal HS denoted by reference character "c" is absent. In this case, image data corresponding to a single scan, which should be acquired, will be missed. Also in the example illustrated in (5) of FIG. 4, an additional 1081th horizontal synchronization signal HS denoted by reference character "d" is output. In this case, image data corresponding to a single scan will be acquired unnecessarily.

In this way, an abnormal image due to some error of the synchronization signal(s) is likely to occur.

In the printer 2, the photographing action is performed more than once (n times; for example, four times) for a single test pattern. The averaging process is performed on n pieces of, or n frames of, image data acquired by these photographing actions. Image data after the averaging process is completed serves as data that is used for the apparatus adjustments.

Hereinafter, with respect to a single test pattern, an explanation will be made on the details of processes for obtaining the image data after the averaging process is completed. FIG. 5 is a flow chart illustrating an example of the procedure of the processes. The test mode is initiated by one of a predetermined operation that a user performs to the printer 2 and an instruction sent from the host computer 1.

When an instruction to print a predetermined test pattern is given after the test mode starts, the test pattern is printed on the sheet M under the control of the printing controller 210 (step S1 of FIG. 5). The test pattern is, for example, a rectangular pattern filled with a color of a predetermined density.

Next, for this test pattern, the photographing action and the addition process on image data are performed n times. First, the number of times i is initialized (i=1, step S2 of FIG. 5), and then the photographing section 221 starts the photographing action of the printed test pattern (step S3 of FIG. 5).

The photographing section 221 outputs the first vertical synchronization signal VS, which indicates the start of the photographing action, to the abnormality determination section 212. Then, the photographing section 221 outputs the first horizontal synchronization signal HS, performs photographing while outputting the first horizontal synchronization signal HS, and outputs image data acquired by the photographing. The synchronization signal and the image data, which are output, are transmitted to the abnormality determination section 212 (step S4 of FIG. 5).

The abnormality determination section 212 transfers the received image data to the processor 213 and also records the received synchronization signals.

In the processor 213, the reading section 216 reads a piece of image data that corresponds to the transferred image data, from a first storage area, for example, the storage area 2181, of the memory 218 in response to the transfer of the image data (step S5 of FIG. 5). It should be noted that the storage areas 2181 and 2182 of the memory 218 are initialized, namely that data values are null, when the processing on the test pattern starts (step S2 of FIG. 5).

Next, the addition processor 214 adds together a piece of image data transferred from the abnormality determination section 212 and the piece of image data read by the reading section 216 (step S6 of FIG. 5). Each piece of image data has a data structure in which each pixel has a density gradation value (any integer value between, for example, 0 and 255, inclusive) for each color. In the addition process, an operation is performed where a density gradation value of a color of a pixel of the transferred piece of image data, which is to be added to the read piece of image data, is added to a density gradation value of the corresponding color of the corresponding pixel of the read piece of image data.

After the addition process is completed, the writing section 215 writes a piece of image data obtained by the addition process to an area of a second storage area of the memory 218 (step S7 of FIG. 5). The second storage area is an area, for example, the storage area 2182, different from the first storage area. The area of the second storage area corresponds to the piece of image data obtained by the addition process. In the writing process, overwriting is performed. Accordingly, data previously stored is discarded. It should be noted that, here, the processes of steps S5, S6, and S7 are collectively referred to as the addition process.

Because the memory 218 is initialized prior to the processes from step S3 through step S7 associated with the first horizontal synchronization signal HS, null data is read in step S5. The writing process of step S7 may therefore be performed on a piece of image data transferred from the abnormality determination section 212 with the processes of steps S5 and S6 being skipped. In this case, the process of the initialization of the memory 218 in step S2 may also be skipped.

Next, for the i-th photographing action, it is determined whether or not the processes are completed for all the horizontal synchronization signals HS of a single frame (step S8 of FIG. 5). In the case where not all the processes are completed ("No" in step S8 of FIG. 5), the processes starting from step S3 are performed in the same way for the next scan, or the next horizontal synchronization signal HS.

After the processes are completed for all the horizontal synchronization signals HS of the single frame ("Yes" in step S8 of FIG. 5), the abnormality determination section 212 determines whether or not an image of the single frame after the completion of the processes is an abnormal image (step S9 of FIG. 5). Specifically, the abnormality determination section 212 analyses the synchronization signals, which have been sent from the photographing section 221 and stored, to determine whether or not any abnormalities exist in the rising width of each horizontal synchronization signal HS and the rising frequency of the horizontal synchronization signals HS. In the case where the result shows the presence of any abnormality illustrated in FIG. 4, the image of the frame that has been processed immediately before is determined to be an abnormal image.

As a result of the determination, in the case where the abnormality determination section 212 determines that the image is not an abnormal image ("Yes" in step S9 of FIG. 5), the first storage area and the second storage area of the memory 218 are exchanged with each other. Specifically, in the case where the storage area 2181 serves as the first storage area and the storage area 2182 serves as the second storage area, the storage area 2182 should be changed to serve as the first storage area and the storage area 2181 should be changed to serve as the second storage area. In the case where the storage area 2182 serves as the first storage area and the storage area 2181 serves as the second storage area, the storage area 2181 should be changed to serve as the first storage area and the storage area 2182 should be changed to serve as the second storage area. In addition, the abnormality determination section 212 increments the number of the photographing actions (namely, i=i+1) (step S10 of FIG. 5). Updated information on the first storage area, the second storage area, and the number i is sent to the processor 213 where the values of the corresponding variables are updated to the respective sent values.

On the other hand, as a result of the determination, in the case where the abnormality determination section 212 determines that the image is an abnormal image ("No" in step S9 of FIG. 5), the first and the second storage areas of the memory 218 are not exchanged with each other, and the first and the second storage areas are kept unchanged. Specifically, in the case where the storage area 2181 serves as the first storage area and the storage area 2182 serves as the second storage area, a condition that the storage area 2181 serves as the first storage area and the storage area 2182 serves as the second storage area should be maintained. In the case where the storage area 2182 serves as the first storage area and the storage area 2181 serves as the second storage area, a condition that the storage area 2182 serves as the first storage area and the storage area 2181 serves as the second storage area should be maintained. In addition, the abnormality determination section 212 does not increment the number of the photographing actions (namely, i=i) (step S11 of FIG. 5). In this case, the values of the corresponding variables in the processor 213 are not updated.

Alternatively, the processor 213 may perform the processes of steps S10 and S11 in response to the result of determining the abnormalities sent from the abnormality determination section 212.

Next, the processing proceeds to step S12. The processor 213 determines whether or not the processes described above have been performed n times, for example, four times. Specifically, the processor 213 determines whether or not a condition that i is larger than n is true. In the case where the condition is not true ("No" in step S12 of FIG. 5), the processes starting from step S3 will be performed in the same way for the next photographing action, or the next frame. The photographing action is ordered by the processor 213.

On the other hand, in the case where the condition that i is larger than n is true ("Yes" in step S12 of FIG. 5), the processor 213 decides that the processes described above have been performed n times. Then, the processor 213 performs the averaging process on image data (step S13 of FIG. 5). Specifically, the reading section 216 reads a piece of image data from a storage area of the memory 218 to which area the writing process has been performed immediately before and transfers the read piece of image data to the averaging processor 217. The averaging processor 217 performs a process to divide a density gradation value d of each color of each pixel by n with respect to the transferred piece of image data, which is generated by performing the addition process on each of the n pieces of image data obtained by n photographing actions. Accordingly, the density gradation value of each color of each pixel is set to d/n.

Image data after the averaging process is completed, or averaged image data, is transmitted from the averaging processor 217 to the correction section 219 (step S14 of FIG. 5).

As described above, the acquisition of image data for a single test pattern is performed. It should be noted that, in the case of using a plurality of test patterns for the apparatus adjustments, or calibration, the same processing is performed on each of the test patterns.

In the image processing described above, image data, which is generated by the photographing section 221 and corresponds to a single frame, has a data quantity of 1080 (pixels)×1920 (pixels)×8 (bits) bits in the case where the density gradation value can take any one of 256 values and the number of colors is one. In the case where the averaging process is performed for four photographing actions, where n is four, the performing of operations after storing four pieces of, or four frames of, image data requires memory, or a storage device, to have a data capacity larger than 1080 (pixels)×1920 (pixels)×8 (bits)×4 bits. In the embodiment, as described above, the addition process is appropriately carried out during the photographing action and the transmitting. It is therefore sufficient to provide the memory 218 with the two storage areas. In the example described above, it is sufficient that each of the two storage areas has a data capacity of 1080 (pixels)×1920 (pixels)×8 (bits) bits. Accordingly, it is possible to set the data capacity of the memory 218 to 1080 (pixels)×1920 (pixels)×8 (bits)×2 bits. Thus, it is possible to reduce the capacity of the memory 218.

In the correction section 219, the image data after the averaging process is completed transmitted from the image processor 211 is analyzed to detect printing failures, such as a positional deviation of printing and density unevenness. In the case where some printing failure is detected, the correction section 219 performs the apparatus adjustments in order to recover from the failure. Specifically, in order to perform, for example, the adjustment of a starting position of printing and the adjustment of a transportation amount of the sheet M, the correction section 219 sets parameters in the printing controller 210. The parameters are related to these adjustments.

As described above, in the printer 2 according to the embodiment, image data corresponding to the test pattern is generated by the averaging process of a plurality of pieces of image data obtained by the multiple photographing actions. The image data thus generated is used for the apparatus adjustments. Accordingly, this feature enables highly precise apparatus adjustments based on the image data with reduced photographing error and high accuracy. In addition, a piece of image data obtained by each of the photographing actions is checked to determine whether or not the piece of image data is abnormal, based on the synchronization signals transmitted by the photographing section 221. In the case where an abnormal image is detected, the photographing action is performed again, and data of the abnormal image is not used. Accordingly, this feature also facilitates the highly precise apparatus adjustments. Furthermore, instead of storing all of the plurality of pieces of (n pieces of, or n frames of) image data, only two storage areas, or the storage area 2181 and the storage area 2182 are provided, and the addition process on pieces of image data are performed in parallel with the photographing action, and, for every frame, the storage area to be used in reading data and the storage area to be used in writing data are exchanged with each other. Accordingly, as described above, the size of the apparatus is reduced and fast processing is performed. Furthermore, in the case where an abnormal image is detected, it is sufficient to perform the processes again only for the piece of image data corresponding to the frame of the abnormal image without performing the exchanging of storage areas described above. This feature also facilitates the fast processing.

In addition, the determination of an abnormal image is performed based on the rising width, or a duration, of the horizontal synchronization signal HS and the rising frequency of the horizontal synchronization signals HS. This enables reliable exclusion of the abnormal image that is caused by a signal error due to noise that is likely to occur.

In addition, the apparatus adjustments with respect to the starting position of printing and the transportation amount of the sheet M are performed based on the image data corresponding to the test pattern, image data of which is obtained with high accuracy. This enables high-quality printing.

It should be noted that the invention is applicable to a printing apparatus that employs a printing system other than an ink jet system.

Note that, in the embodiments described above, the printing controller 210, the print head 222, the carriage 223, the paper transporting section 224, and the like correspond to a printing section of the invention.

The scope of protection of the invention should not be limited to the embodiments described above and covers the invention described in the appended claims and equivalents of the invention as well.

What is claimed is:

1. An image processing device adapted to be provided with a photographing device configured to generate image data by photographing a print pattern printed on a medium and to output the generated image data, vertical synchronization signals defining a single frame of the image data, and horizontal synchronization signals each defining a line of the single frame, the image processing device comprising:
a first processor configured to, based on the vertical synchronization signals and the horizontal synchronization signals, determine occurrence of abnormalities of the image data that is input;
a memory including two storage areas; and
a second processor configured to
perform for each frame of the image data an addition process while exchanging a first storage area of the memory to be used for reading and a second storage area different from the first storage area of the memory to be used for writing with each other, and
generate, after completing addition processes for a whole of the image data, averaged image data, each of the addition processes including reading data from the first storage area, adding the read data to one frame of the image data that is input, and writing resultant data to the second storage area, wherein
the second processor is configured to, in a case where the first processor determines occurrence of an abnormality in a frame of the image data that is input, cause the photographing device to take a photograph of the print pattern again to generate image data, cause the photographing device to output the image data that is generated, and perform, without exchanging the first and the second storage areas of the memory with each other, the addition process on the image data that is input.

2. The image processing device according to claim 1, wherein
the first processor is configured to, based on a rising frequency or a rising width of each horizontal synchronization signal in a period during which the vertical synchronization signals are output, determine occurrence of the abnormalities of the image data that is input.

3. A printing apparatus comprising:
a printing section configured to perform printing onto a medium; and
the image processing device according to claim 1.

4. A printing apparatus comprising:
a printing section configured to perform printing onto a medium; and the image processing device according to claim 2.

5. The printing apparatus according to claim 3, further comprising a correction section configured to, based on the averaged image data, perform at least one of an adjustment of a starting position of printing and an adjustment of a transportation amount of the medium.

6. The printing apparatus according to claim 4, further comprising a correction section configured to, based on the averaged image data, perform at least one of an adjustment of a starting position of printing and an adjustment of a transportation amount of the medium.

7. A control method for controlling an image processing device provided with a memory including two storage areas, the image processing device being adapted to be provided with a photographing device configured to generate image data by photographing a print pattern printed on a medium and to output the generated image data, vertical synchronization signals defining a single frame of the image data, and horizontal synchronization signals each defining a line of the single frame, the control method comprising:
    determining, based on the vertical synchronization signals and the horizontal synchronization signals, occurrence of abnormalities of the image data that is input; and
    performing operations that include:
        performing for each frame of the image data an addition process while exchanging a first storage area of the memory to be used for reading and a second storage area different from the first storage area of the memory to be used for writing with each other, each of the addition process including reading data from the first storage area, adding the read data to one frame of the image data that is input, and writing resultant data to the second storage area; and
        generating, after completing whole performance of the addition process, averaged image data, wherein
    in a case where occurrence of an abnormality is determined, in the determining, in a frame of the image data that is input, the photographing device is, in the performing operations, caused to take a photograph of the print pattern again to generate image data, to output the image data generated, and without exchanging the first and the second storage areas of the memory with each other, the addition process is performed on the image data that is input.

\* \* \* \* \*